United States Patent
Dietewich et al.

[11] Patent Number: 5,567,034
[45] Date of Patent: Oct. 22, 1996

[54] MOTOR VEHICLE HEADLAMP

[75] Inventors: Horst Dietewich, Petershausen; Joachim Ripperger, Unterföhring; Tassilo Stempfl, München; Albert Gröber, Eichenau, all of Germany

[73] Assignee: Bayerische Motoren Werke AG, Munich, Germany

[21] Appl. No.: 382,264

[22] Filed: Feb. 1, 1995

Related U.S. Application Data

[63] Continuation-in-part of Ser. No. 98,031, Jul. 28, 1993, abandoned.

[30] Foreign Application Priority Data

Jul. 28, 1992 [DE] Germany ................. 42 24 856.5

[51] Int. Cl.⁶ ................................................. B60Q 1/06
[52] U.S. Cl. ............... 362/66; 362/268; 362/285; 362/308; 362/331; 362/427
[58] Field of Search ....................... 362/61, 66, 80, 362/268, 307–309, 331, 332, 351, 355, 418, 427, 285

[56] References Cited

U.S. PATENT DOCUMENTS 4,895,693  1/1990  Suzuki et al. ................. 362/61
4,949,226  8/1990  Makita et al. ................. 362/61
5,055,981  10/1991 Nino ............................. 362/61
5,068,768  11/1991 Kobayashi .................... 362/61
5,113,330  5/1992  Makita ......................... 362/265
5,117,335  5/1992  Yamada ........................ 362/61

FOREIGN PATENT DOCUMENTS 0273353     7/1988   European Pat. Off. .
0433840A1   6/1991   European Pat. Off. .
650667      11/1930  France .
33 22 181 A1 1/1985  Germany .
36 33 662 A1 4/1988  Germany .

Primary Examiner—Denise L. Cromada
Assistant Examiner—Alan B. Cariaso
Attorney, Agent, or Firm—Evenson, McKeown, Edwards & Lenahan, P.L.L.C.

[57] ABSTRACT

In the case of a motor vehicle headlamp comprising a light source, a reflector, a projecting lens, a diffusing lens and a cover plate, it is provided that the diffusing lens has a central opening which is at least partially penetrated by the projecting lens. In certain preferred embodiments, the light source reflector and projecting lens are carried by a movable and adjustable frame, and the diffusing lens and cover plate are fixed in position at a vehicle headlamp mounting recess.

6 Claims, 3 Drawing Sheets

MOTOR VEHICLE HEADLAMP

BACKGROUND AND SUMMARY OF THE INVENTION

This application is a continuation-in-part application of copending application Ser. No. 08/098,031 filed Jul. 28, 1993 now abandoned.

This invention relates to a motor vehicle headlamp comprising a reflector, a projecting lens, a diffusing lens and a cover plate.

A motor vehicle headlamp operating according to the projection principle is known, for example, from German Patent Document DE-PS 36 40 773. In the case of this motor vehicle headlamp, the projecting lens is situated in front of the cover plate. Furthermore, motor vehicle headlamps of the above-noted type are being used in the case of which a diffusing lens with a plane or curved surface is situated between the cover plate and the projecting lens. It is an object of this diffusing lens to achieve an appearance of the headlamp that is identical to that of conventional headlamps. These headlamps do not operate according to the projection principle but have only a reflector, a diffusing lens and a cover disk. In contrast to headlamps which operate according to the projection principle, these headlamps have a reflector with a clearly larger diameter.

When, as described above, in the case of a headlamp with a projection principle, a diffusing lens is provided between the cover plate and the projecting lens, this results in a relatively large overall depth of the headlamp. This overall depth corresponds to that of a conventional headlamp. However, the gain in mounting space which is obtained for headlamps of this type because of the clearly smaller reflector diameter is largely lost.

U.S. pat. No. 4,949,226 discloses a projector type lighting device of expanded outline appearance for use as a vehicular headlamp. A transparent material outline expander plate is disposed to annularly surround the light assembly and includes cone shaped cavities on its rear face for reflecting light forwardly to give the appearance of a larger light source.

It is an object of the invention to provide a motor vehicle headlamp of the initially mentioned type which operates according to the projection principle, has a diffusing lens in addition to a cover disk or plate and has a low overall depth. A further object of the invention is to provide a vehicle headlamp assembly of simple construction which is also adjustable.

The invention achieves these and other objects by providing a headlamp wherein the diffusing lens has a central opening which is at least partially penetrated by the projecting lens. In preferred embodiments, the diffusing lens is a curved lens which is fixed in position and other parts of the light assembly are disposed at an adjustable frame.

The penetration of the diffusing lens by the projecting lens has the result that in comparison to such a headlamp without any projecting lens no additional mounting space is required. Furthermore, the light emerging from the projecting lens will pass through the diffusing lens without any loss of light. This diffusing lens affects only the light emitted laterally by the projecting lens and collects this light to form a corona which, in conjunction with the projecting lens results in a plane overall appearance of the light source. The apparently effective light area of the headlamp corresponds to that of conventional headlamps.

Since the diffusing lens absorbs only an insignificant portion of the light emitted by the projecting lens, it is not subjected to significant thermal stress. It is therefore possible to manufacture the diffusing lens of a transparent plastic material and thus reduce its weight. Therefore, the diffusing lens also increases only insignificantly the weight of the headlamp compared to a headlamp without any diffusing lens which operates according to the projection principle.

Because of the relatively low weight of the diffusing lens, this diffusing lens may be fastened to the edge of the reflector. It will then only insignificantly change the optical characteristics of the reflector in the case of mechanical stress. On the whole, a construction is therefore obtained which is distinguished by advantages with respect to manufacturing techniques. The diffusing lens is fastened together with the reflector and may be inserted into the headlamp shell together with the reflector as a constructional unit.

In certain preferred embodiments, the diffusion lens is fixed in position at a vehicle light support opening and an adjustable frame is provided which supports a light source assembly comprising a light source, a reflector assembly and a projection lens. The adjusting mechanism can adjust for high and low beam, as well as the lateral position of the light beam.

Other objects, advantages and novel features of the present invention will become apparent from the following detailed description of the invention when considered in conjunction with the accompanying drawings.

DETAILED DESCRIPTION OF THE DRAWINGS

Figure 1:
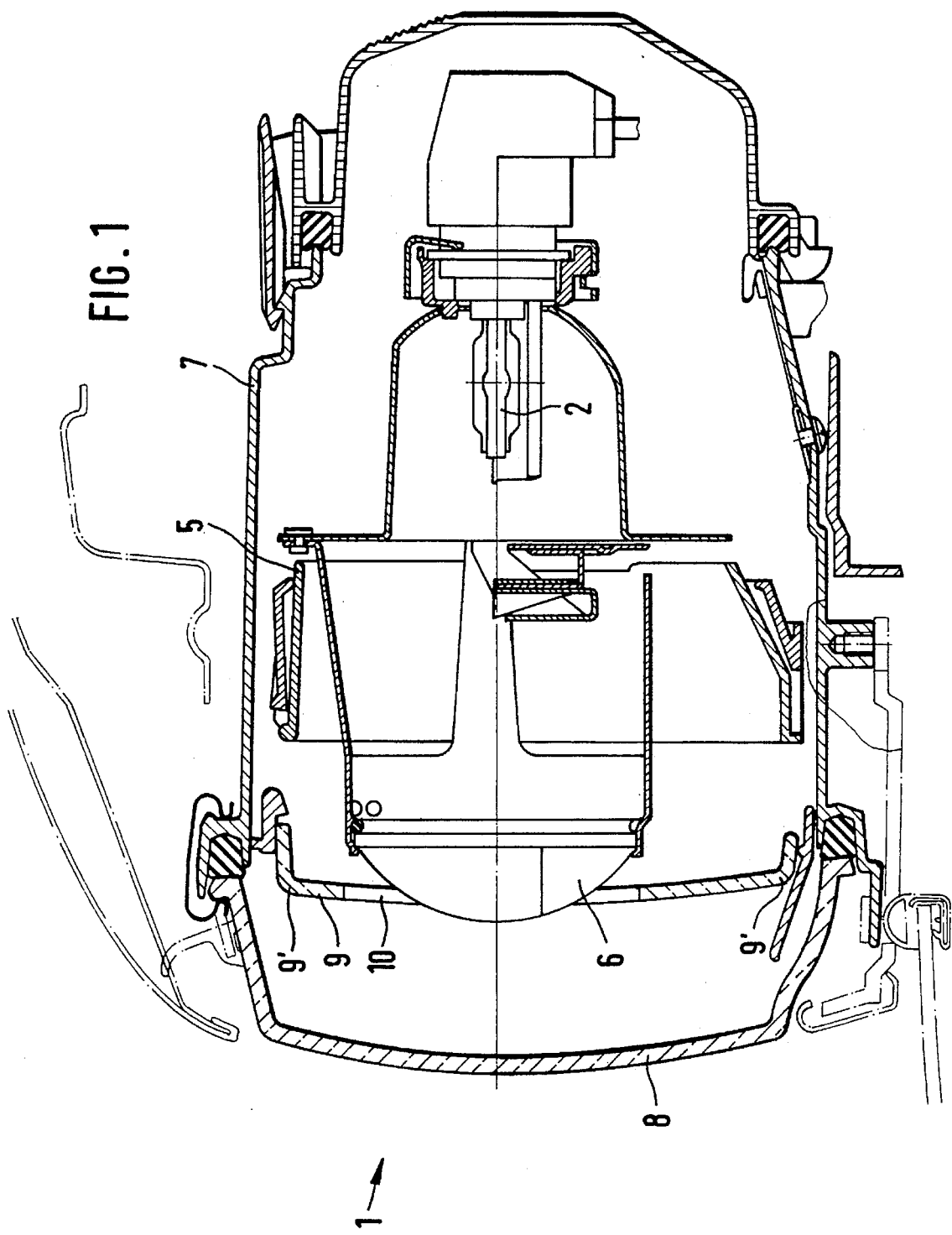
FIG. 1 is a schematic top sectional view of a motor vehicle headlamp assembly constructed according to a first preferred embodiment of the invention with a space-saving arrangement of a diffusing lens.

The motor vehicle headlamp 1 illustrated in FIG. 1 comprises essentially the following parts: A bulb 2, a reflector 3, auxiliary reflectors 4 and 5 as well as a projecting lens 6. The headlamp 1 is disposed in a shell 7 and forms, together with other lamps which are not shown, a constructional unit which is covered toward the outside by means of a cover plate 8 which is transparent allowing transmittance of light therethrough.

In addition to these known elements, the headlamp also has a diffusing lens 9 which is known per se and which is provided with a central opening 10. The projecting lens 6 penetrates through this opening 10. The position of the diffusing lens 9 relative to the projecting lens 6 is such that the light emerging from the headlamp 1 passes essentially free through the opening 10 and enters, behind the cover plate 8, into the exterior space of the motor vehicle. Only a small portion of the light emerges laterally out of the projecting lens 6 and arrives in the diffusing lens 9. From the front, that is, viewed from the space illuminated by the light of the headlamp, the effective luminous area of the headlamp 1 acts as a plane which is bounded by the edge 9' of the diffusing lens 9. With respect to the luminous area which is the result of the outer dimensions of the projecting lens 6, this luminous area has the appearance of being enlarged several times.

Because of the penetration, the mounting space required by the diffusing lens 9 is approximately equal to the mounting space which is required when there is no diffusing lens of this type. Because of the small dimensions and the arrangement as shown, the diffusing lens 9 may consist of a plastic material and may be fastened by way of a funnel-shaped additional reflector 3' to the edge of the reflector 3 (not shown in detail). A headlamp is therefore obtained which, in addition to its good appearance, is also distinguished by an unchanged mounting space.

Figure 2:
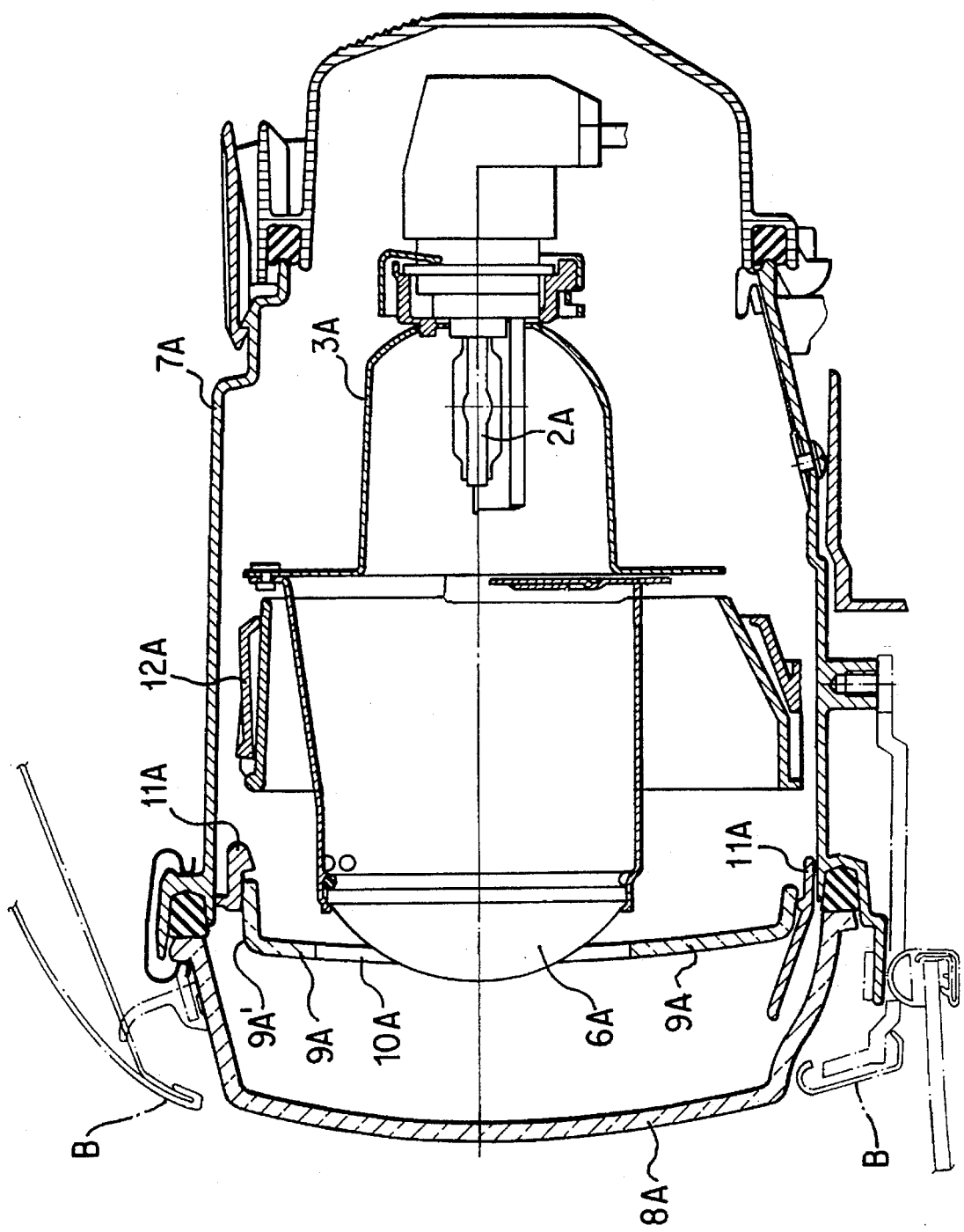
FIG. 2 is a schematic sectional view of a motor vehicle headlamp assembly constructed according to a second preferred embodiment of the invention with a space-saving arrangement of a diffusing lens and with an adjusting assembly.
Figure 3:
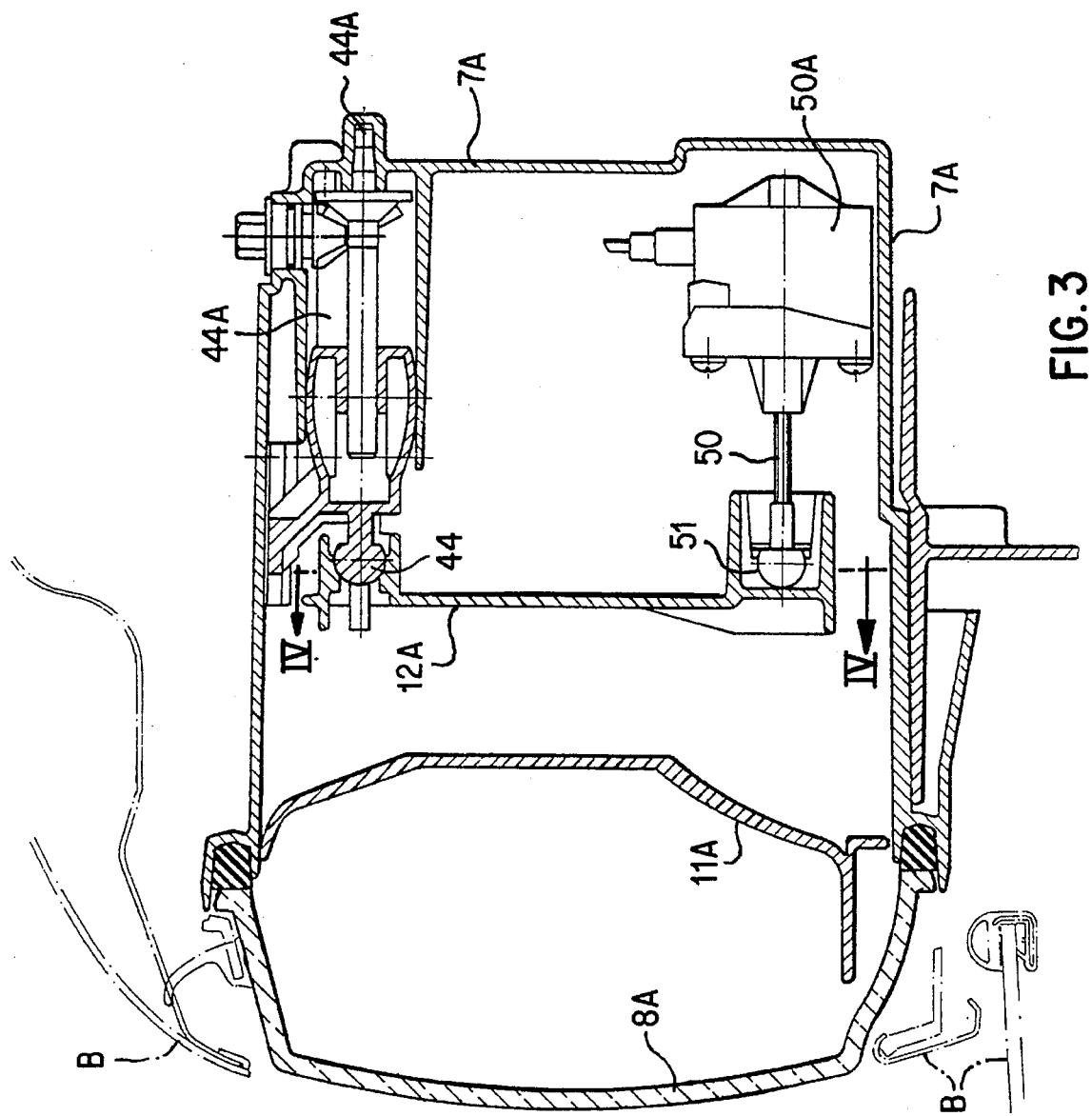
FIG. 3 is a schematic sectional view of the headlamp assembly of FIG. 2, depicting the adjusting mechanism in more detail.

FIGS. 2 and 3 schematically depict an embodiment of the invention which provides for adjustment support of the light source assembly. In FIGS. 2 and 3, a light assembly housing or shell 7A is adapted to be fixed into position in a vehicle headlight opening surrounding by body parts B. A cover plate 8A is fixed at the frame 7A by way of seal connections S. The diffusing lens 9A is also disposed to be fixed in position at the frame 7A by way of an interposed frame unit 11A in the form of a frame surrounding the diffusion lens 9A. A secondary adjustable support frame 12A is provided which is fixedly attached to and supports a light source assembly including a bulb 2A, a reflector 3A, and a projecting lens 6A. The light source assembly, including the projecting lens 6A, protrudes through an opening 10A in the diffusing lens 9A in the manner as described above for the embodiment of FIG. 1. It need only be assured that the clearance space between the opening 10A and the projection lens 6A is sufficient to accommodate adjustment movement of the light source assembly at frame 12A.

FIG. 2 schematically depicts the adjusting assemblies for the secondary frame 12A which supports the light source assembly. At one bearing position 44, the frame 12A is connected to a dimmer adjusting mechanism 44A which tilts the frame of slightly to change from bright to dim light conditions. Additional adjusting mechanisms 50 are provided at at least two different bearing points 51 of the frame 12A for adjusting the lateral movement of the frame, and consequently of the light projecting lens 6A. Actuators 44A and 50A for the adjusting movement of frame 12A may include pneumatic devices or electric motor and screw devices.

Figure 4:
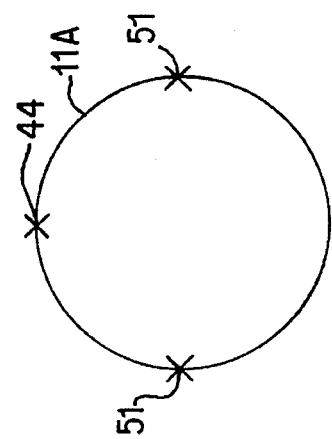
FIG. 4 is a schematic sectional view along line IV—IV of FIG. 3, depicting bearing points for the frame supporting the light source assembly.

FIG. 4 schematically depicts the circumferential location of the bearing points 44 and 51 at the frame 12A for one practical embodiment. In operation of the dimmer switch mechanism 44A, the frame 12A and light assembly carried therewith is pivoted about an axis through the bearing points 51. In operation of the lateral adjusting mechanism 50A, the frame 12A is pivoted about the bearing point 44.

With the embodiment of FIGS. 2 and 3, simple adjusting support of the light source assembly is provided, while maintaining the diffusing lens 9A with its opening 10A in a fixed position. Thus, a simple economical construction is provided which facilitates full operation of the headlight assembly while minimizing the longitudinal extent of the assembly due to protrusion of the projecting lens 6A through the opening 10A in the diffusing lens 9A. The diffusing lenses 9 and 9A are plain plastic lenses which are slightly curved as shown in the drawings, to thereby give the desired diffusing effect without requiring any special reflectors or the like.

Although the invention has been described and illustrated in detail, it is to be clearly understood that the same is by way of illustration and example, and is not be taken by way of limitation. The spirit and scope of the present invention are to be limited only by the terms of the appended claims.

What is claimed is:

1. A motor vehicle headlamp comprising:

a light source, a reflector for reflecting light from the light source in a forward direction, a projecting lens in front of the reflector for projecting the light forwardly, a cover plate in front of the projecting lens, a diffusing lens which has a central opening which is at least partially penetrated in a forward direction by the projecting lens, said diffusing lens being configured to effect transmission of only light emitted laterally by the projecting lens to form a corona which, together with the projecting lens, forms an apparently effective light area of the headlamp as viewed from the front which is equivalent to the area of the diffusing lens and its central opening penetrated by the projecting lens;

further comprising an adjusting frame supporting a light source assembly including the light source, the reflector and the projecting lens, and an adjustment mechanism for adjusting the adjusting frame with respect to fixed vehicle body parts to thereby adjust the aiming position of the light source assembly;

wherein said adjustment mechanism includes means for moving the adjusting frame and light source assembly to be aimed in different lateral directions; and wherein the central opening in the diffuser is of a size to accommodate the adjusting movement of the light source assembly including the projecting lens.

2. A motor vehicle headlamp according to claim 1, wherein the diffusing lens is a thin curved transparent plastic material plate member.

3. A motor vehicle headlamp according to claim 1, wherein the diffusing lens is manufactured of a transparent plastic material.

4. A motor vehicle headlamp according to claim 1, wherein said diffusing lens is fixed in position at a vehicle headlamp opening part.

5. A motor vehicle headlamp according to claim 1, wherein said adjustment mechanism includes means for pivoting the adjusting frame and light source assembly about a horizontal axis to thereby adjust for bright and dim lighting operation.

6. A motor vehicle headlamp comprising:

a housing;

a separate light source assembly comprising a light source, a reflector for reflecting light from the light source in a forward direction, and a projecting lens in front of the reflector for projecting the light forwardly;

a cover plate arranged in front of the projecting lens, a diffusing lens which has a central opening which is at least partially penetrated in a forward direction by the projecting lens, said diffusing lens being configured to effect transmission of only light emitted laterally by the projecting lens to form a corona which, together with the projecting lens, forms an apparently effective light area of the headlamp as viewed from the front which is equivalent to the area of the diffusing lens and its central opening penetrated by the projecting lens;

means for adjusting the light source assembly within the housing to allow the light source assembly to be aimed in different lateral directions; and wherein the central opening in the diffuser is of a size to accommodate the adjusting movement of the light source assembly including the projecting lens.

* * * * *

UNITED STATES PATENT AND TRADEMARK OFFICE
CERTIFICATE OF CORRECTION

PATENT NO. : 5,567,034
DATED : October 22, 1996
INVENTOR(S) : Horst Dietewich, Joachim Ripperger, Tassilo Stempfl, Albert Gröber It is certified that error appears in the above-indentified patent and that said Letters Patent is hereby corrected as shown below:

Title page,
Please correct the Foreign Application Priority Data by stating the German priority application to be DE 42 24 865.5 instead of DE 42 24 856.5.

Signed and Sealed this

Eleventh Day of March, 1997

Attest:

BRUCE LEHMAN

Attesting Officer    Commissioner of Patents and Trademarks